US012621272B2

(12) United States Patent
Ghazi et al.

(10) Patent No.: US 12,621,272 B2
(45) Date of Patent: May 5, 2026

(54) SYSTEMS AND METHODS FOR LOCALLY PRIVATE NON-INTERACTIVE COMMUNICATIONS

(71) Applicant: Google LLC, Mountain View, CA (US)

(72) Inventors: Badih Ghazi, San Jose, CA (US); Shanmugasundaram Ravikumar, Piedmont, CA (US); Alisa Chang, Santa Clara, CA (US); Pasin Manurangsi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 241 days.

(21) Appl. No.: 18/011,995

(22) PCT Filed: Dec. 20, 2021

(86) PCT No.: PCT/US2021/064371
§ 371 (c)(1),
(2) Date: Dec. 21, 2022

(87) PCT Pub. No.: WO2022/211863
PCT Pub. Date: Oct. 6, 2022

(65) Prior Publication Data
US 2023/0308422 A1 Sep. 28, 2023

Related U.S. Application Data

(60) Provisional application No. 63/168,533, filed on Mar. 31, 2021.

(51) Int. Cl.
*H04L 9/40* (2022.01)
*G06F 21/60* (2013.01)

(52) U.S. Cl.
CPC ........ *H04L 63/0428* (2013.01); *G06F 21/604* (2013.01)

(58) Field of Classification Search
CPC ........................... H04L 63/0428; G06F 21/604
See application file for complete search history.

(56) References Cited

U.S. PATENT DOCUMENTS 11,023,594 B2 * 6/2021 Nissim Kobliner ........................
G06F 21/6245
2010/0067113 A1 * 3/2010 Harrison ............... G06F 16/248
359/554

(Continued)

OTHER PUBLICATIONS

International Preliminary Report on Patentability for Application No. PCT/US2021/064371, mailed Oct. 12, 2023, 8 pages.

(Continued)

*Primary Examiner* — Aftab N. Khan
(74) *Attorney, Agent, or Firm* — DORITY & MANNING P.A.

(57) ABSTRACT

A computer-implemented method for encoding data for communications with improved privacy includes obtaining, by a computing system comprising one or more computing devices, input data including one or more input data points. The method can include constructing, by the computing system, a net tree including potential representatives of the one or more input data points, the potential representatives arranged in a plurality of levels, the net tree including a hierarchical data structure including a plurality of hierarchically organized nodes. The method can include determining, by the computing system, a representative of each of the one or more input data points from the potential representatives of the net tree, the representative including one of the plurality of hierarchically organized nodes. The method can include encoding, by the computing system, the representative of each of the one or more input data points for communication.

13 Claims, 10 Drawing Sheets

(56) References Cited

U.S. PATENT DOCUMENTS

| | | | |
|---|---|---|---|
| 2019/0318810 A1* | 10/2019 | Gkoulalas-Divanis ...................... G06F 21/6227 |
| 2019/0347278 A1* | 11/2019 | Park .................... G06F 16/2465 |
| 2020/0327252 A1* | 10/2020 | Mcfall .................... G06F 21/78 |
| 2021/0073677 A1* | 3/2021 | Peterson ................ G06N 20/00 |
| 2021/0226924 A1* | 7/2021 | Yanai .................. H04L 63/0421 |
| 2022/0019441 A1* | 1/2022 | Rosing ................... G06N 3/084 |
| 2022/0038436 A1* | 2/2022 | Upadhyay ........... H04L 63/0428 |
| 2022/0129760 A1* | 4/2022 | Ravikumar ......... G06F 21/6245 |
| 2022/0223161 A1* | 7/2022 | Fuchs ................ G10L 21/0232 |
| 2024/0135029 A1* | 4/2024 | Ghassemi ............... G06F 17/18 |
| 2024/0202518 A1* | 6/2024 | Eisner ...................... G06N 3/08 |
| 2024/0249153 A1* | 7/2024 | Kadhe ...................... G06N 5/01 |
| 2024/0265294 A1* | 8/2024 | Ghazi ...................... G06N 7/01 |

OTHER PUBLICATIONS

Ghazi et al., "On the Power of Multiple Anonymous Messages", arXiv:1908.11358v4, May 19, 2020, 70 pages.
Har-Peled et al., "Fast Construction of Nets in Low Dimensional Metrics and Their Applications", arXiv:cs/049057v3, Aug. 22, 2005, 42 pages.
International Search Report for Application No. PCT/ US2021/ 064371, mailed on Apr. 4, 2022, 2 pages.
Stemmer, "Locally Private k-Means Clustering", arXiv:1907. 02513v1, Jul. 4, 2019, 34 pages.
Su et al., "Differentially Private K-Means Clustering", Conference on Data and Application Security and Privacy, Mar. 9-11, 2016, New York, New York, United States, pp. 26-37.
Wang et al., "A Comprehensive Survey on Local Differential Privacy Toward Data Statistics and Analysis", arXiv:2010.05253v3, Jan. 28, 2021, 28 pages.

* cited by examiner

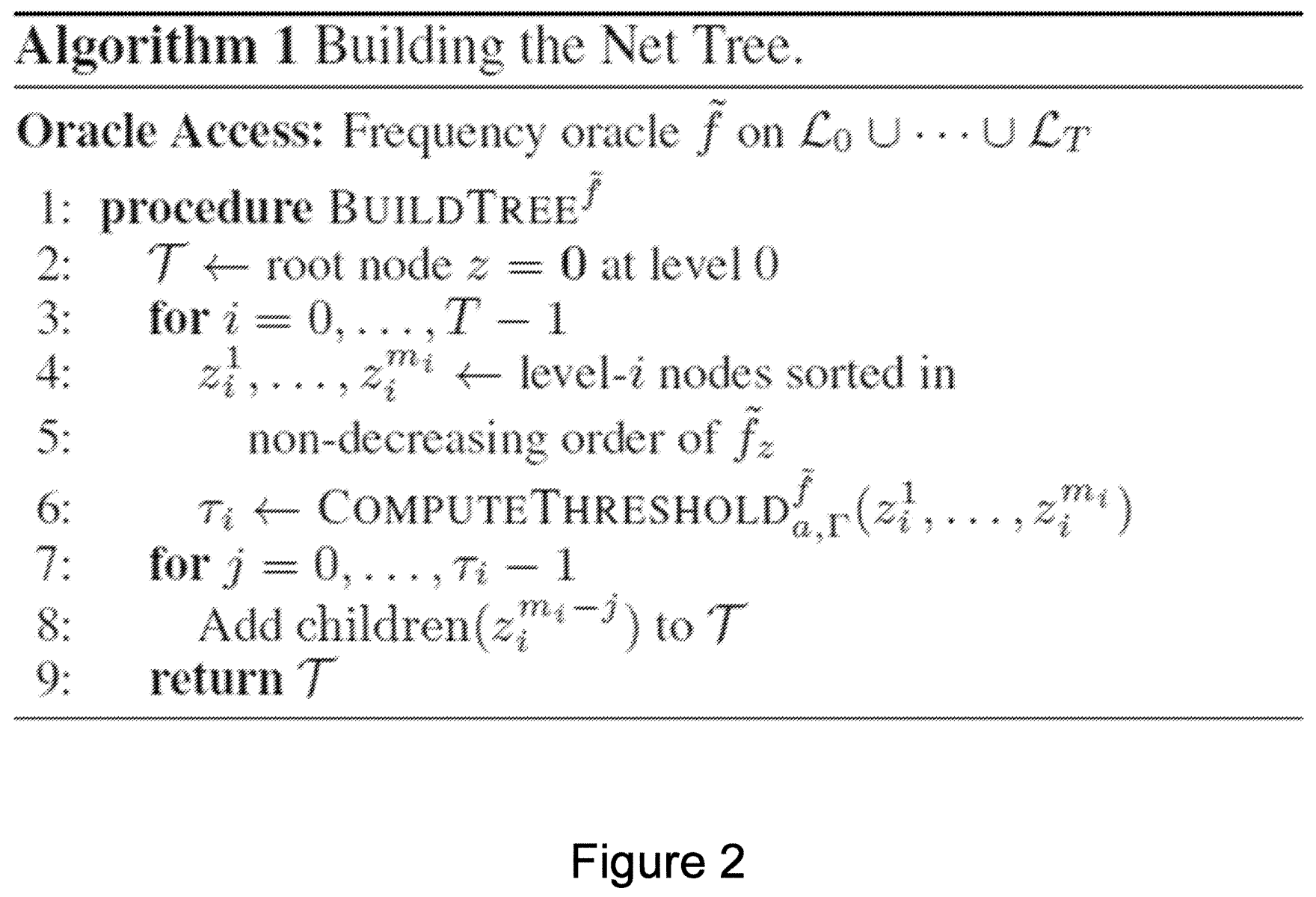

Algorithm 1 Building the Net Tree.

Oracle Access: Frequency oracle $\tilde{f}$ on $\mathcal{L}_0 \cup \cdots \cup \mathcal{L}_T$ 1: procedure BUILDTREE$^{\tilde{f}}$
2: $\quad \mathcal{T} \leftarrow$ root node $z = 0$ at level 0
3: $\quad$ for $i = 0, \ldots, T - 1$
4: $\qquad z_i^1, \ldots, z_i^{m_i} \leftarrow$ level-$i$ nodes sorted in
5: $\qquad$ non-decreasing order of $\tilde{f}_z$
6: $\qquad \tau_i \leftarrow$ COMPUTETHRESHOLD$^{\tilde{f}}_{a,\Gamma}(z_i^1, \ldots, z_i^{m_i})$
7: $\qquad$ for $j = 0, \ldots, \tau_i - 1$
8: $\qquad\quad$ Add children($z_i^{m_i - j}$) to $\mathcal{T}$
9: $\quad$ return $\mathcal{T}$

Figure 2

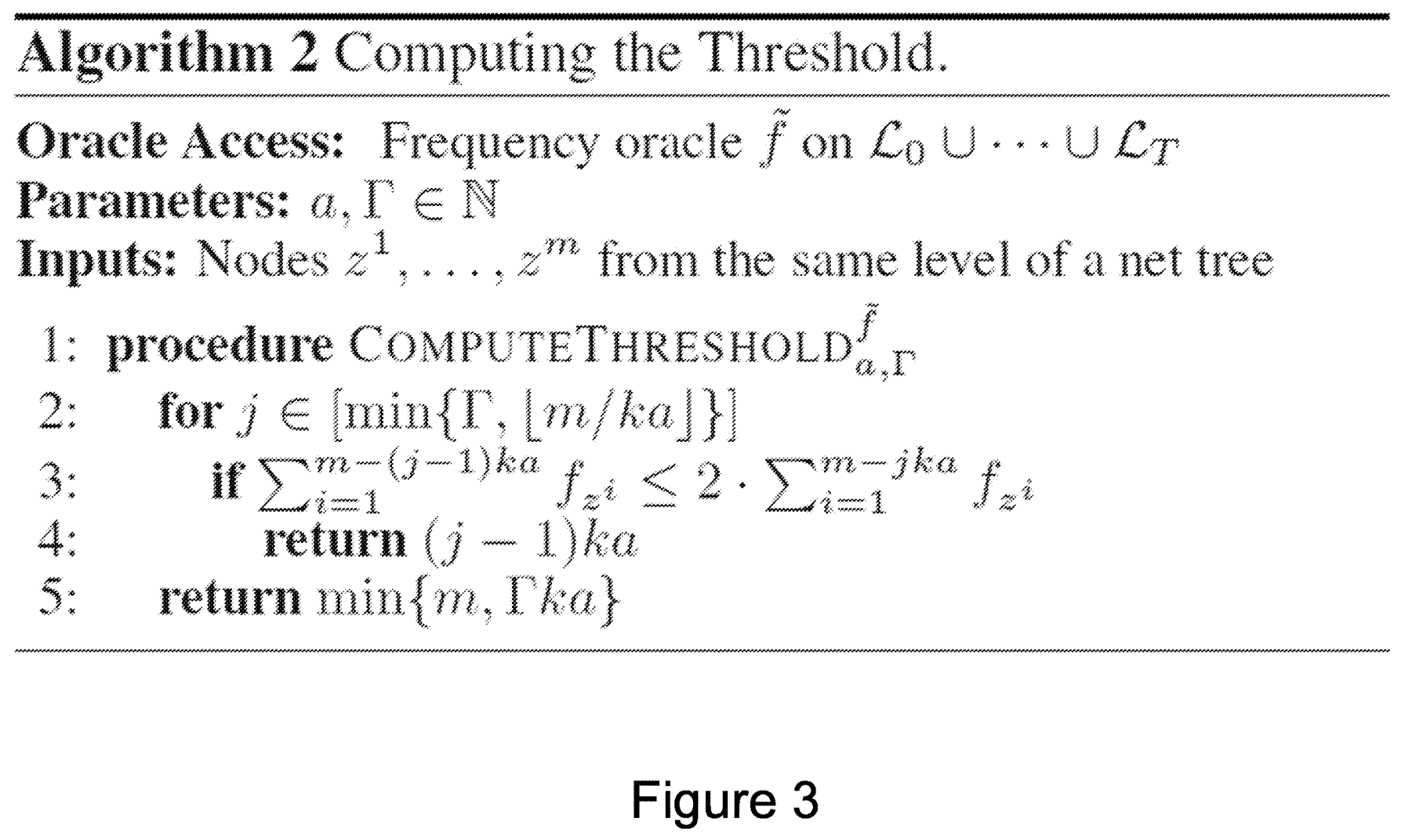

Algorithm 2 Computing the Threshold.

Oracle Access: Frequency oracle $f$ on $\mathcal{L}_0 \cup \cdots \cup \mathcal{L}_T$ Parameters: $a, \Gamma \in \mathbb{N}$ Inputs: Nodes $z^1, \ldots, z^m$ from the same level of a net tree 1: procedure COMPUTETHRESHOLD$_{a,\Gamma}^{\tilde{f}}$ 2:     for $j \in [\min\{\Gamma, \lceil m/ka \rceil\}]$ 3:         if $\sum_{i=1}^{m-(j-1)ka} f_{z^i} \le 2 \cdot \sum_{i=1}^{m-jka} f_{z^i}$ 4:             return $(j-1)ka$ 5:     return $\min\{m, \Gamma ka\}$

Figure 3

Figure 4:
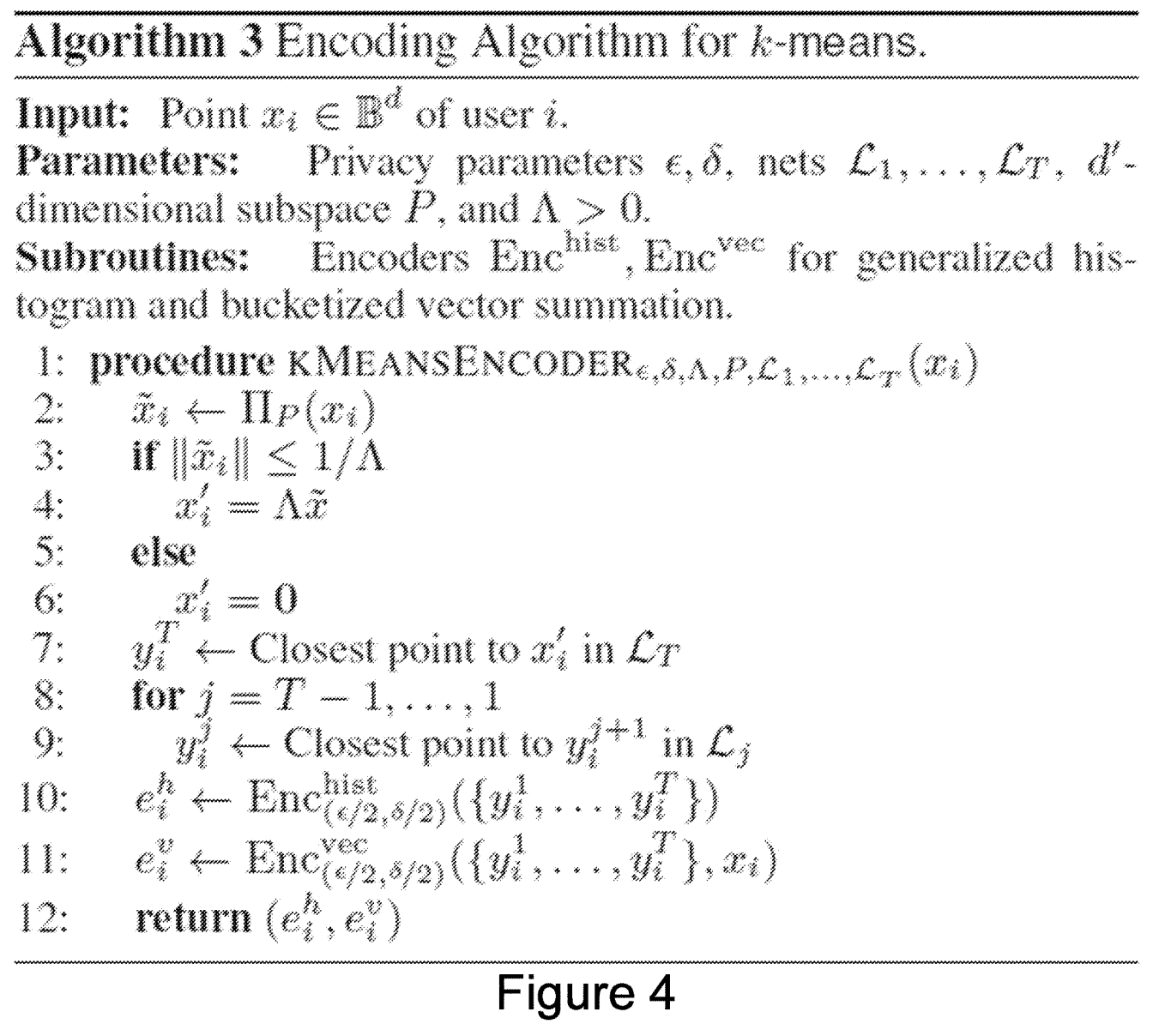

Algorithm 3 Encoding Algorithm for $k$-means.

Input: Point $x_i \in \mathbb{B}^d$ of user $i$.

Parameters: Privacy parameters $\epsilon$, $\delta$, nets $\mathcal{L}_1, \ldots, \mathcal{L}_T$, $d'$-dimensional subspace $P$, and $\Lambda > 0$.

Subroutines: Encoders $\text{Enc}^{\text{hist}}$, $\text{Enc}^{\text{vec}}$ for generalized histogram and bucketized vector summation.

1: procedure $\text{KMEANSENCODER}_{\epsilon,\delta,\Lambda,P,\mathcal{L}_1,\ldots,\mathcal{L}_T}(x_i)$
2: $\quad \tilde{x}_i \leftarrow \Pi_P(x_i)$
3: $\quad$ if $\|\tilde{x}_i\| \leq 1/\Lambda$
4: $\quad\quad x_i^t = \Lambda \tilde{x}$
5: $\quad$ else
6: $\quad\quad x_i^t = 0$
7: $\quad y_i^T \leftarrow$ Closest point to $x_i^t$ in $\mathcal{L}_T$
8: $\quad$ for $j = T - 1, \ldots, 1$
9: $\quad\quad y_i^j \leftarrow$ Closest point to $y_i^{j+1}$ in $\mathcal{L}_j$
10: $\quad e_i^h \leftarrow \text{Enc}^{\text{hist}}_{(\epsilon/2,\delta/2)}(\{y_i^1, \ldots, y_i^T\})$
11: $\quad e_i^v \leftarrow \text{Enc}^{\text{vec}}_{(\epsilon/2,\delta/2)}(\{y_i^1, \ldots, y_i^T\}, x_i)$
12: $\quad$ return $(e_i^h, e_i^v)$

Figure 5:
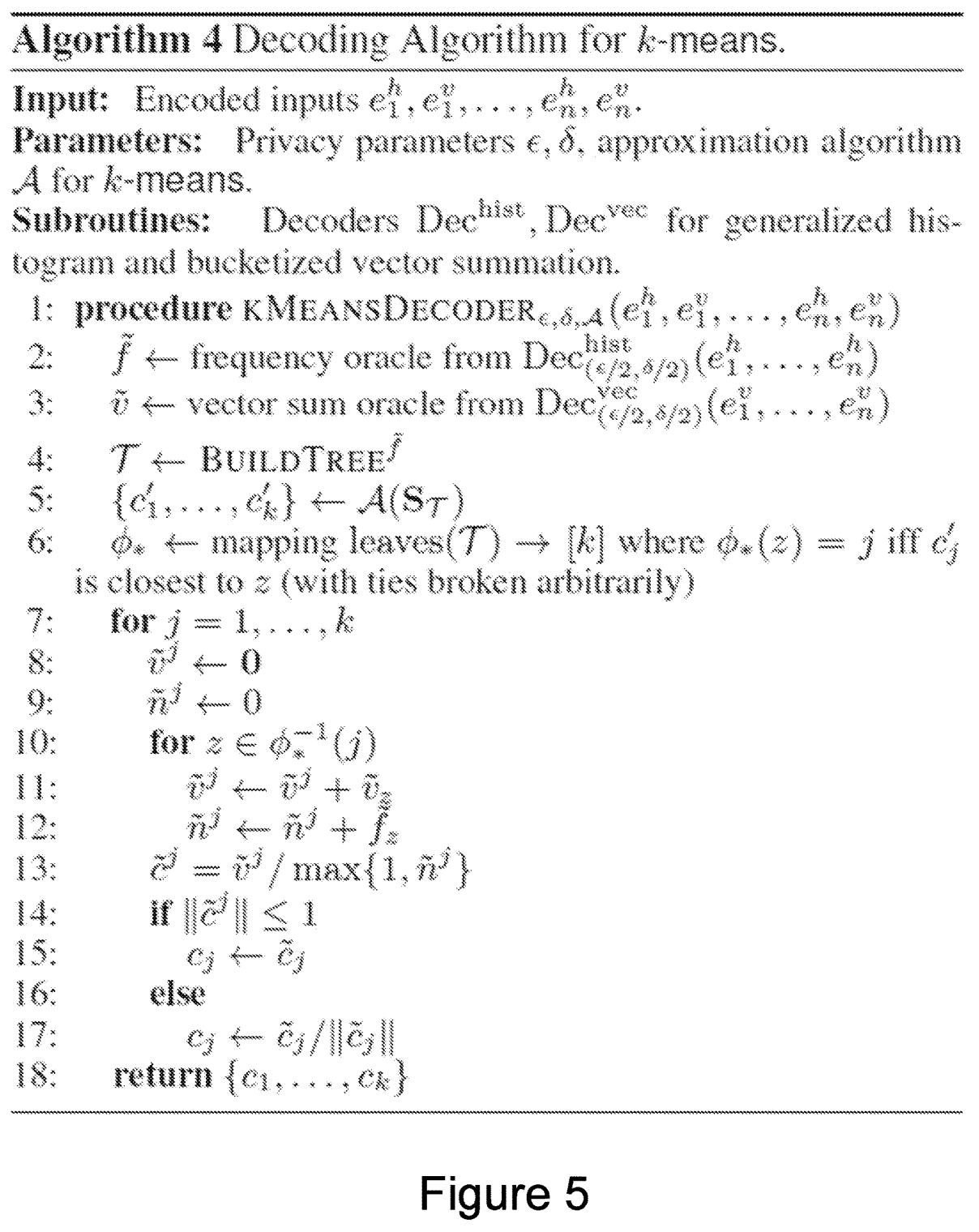

Algorithm 4 Decoding Algorithm for $k$-means.

---

Input: Encoded inputs $e_1^h, e_1^v, \ldots, e_n^h, e_n^v$.

Parameters: Privacy parameters $\epsilon, \delta$, approximation algorithm $\mathcal{A}$ for $k$-means.

Subroutines: Decoders $\text{Dec}^{\text{hist}}, \text{Dec}^{\text{vec}}$ for generalized histogram and bucketized vector summation.

1: procedure $\text{KMEANSDECODER}_{\epsilon,\delta,\mathcal{A}}(e_1^h, e_1^v, \ldots, e_n^h, e_n^v)$
2:     $\tilde{f} \leftarrow$ frequency oracle from $\text{Dec}_{(\epsilon/2,\delta/2)}^{\text{hist}}(e_1^h, \ldots, e_n^h)$
3:     $\tilde{v} \leftarrow$ vector sum oracle from $\text{Dec}_{(\epsilon/2,\delta/2)}^{\text{vec}}(e_1^v, \ldots, e_n^v)$ 4:     $\mathcal{T} \leftarrow \text{BUILDTREE}^{\tilde{f}}$
5:     $\{c_1', \ldots, c_k'\} \leftarrow \mathcal{A}(S_{\mathcal{T}})$
6:     $\phi_* \leftarrow$ mapping $\text{leaves}(\mathcal{T}) \to [k]$ where $\phi_*(z) = j$ iff $c_j'$
       is closest to $z$ (with ties broken arbitrarily)
7:     for $j = 1, \ldots, k$
8:         $\tilde{v}^j \leftarrow \mathbf{0}$
9:         $\tilde{n}^j \leftarrow 0$
10:        for $z \in \phi_*^{-1}(j)$
11:            $\tilde{v}^j \leftarrow \tilde{v}^j + \tilde{v}_z$
12:            $\tilde{n}^j \leftarrow \tilde{n}^j + \tilde{f}_z$
13:        $\tilde{c}^j = \tilde{v}^j / \max\{1, \tilde{n}^j\}$
14:        if $\|\tilde{c}^j\| \leq 1$
15:            $c_j \leftarrow \tilde{c}_j$
16:        else
17:            $c_j \leftarrow \tilde{c}_j / \|\tilde{c}_j\|$
18:     return $\{c_1, \ldots, c_k\}$

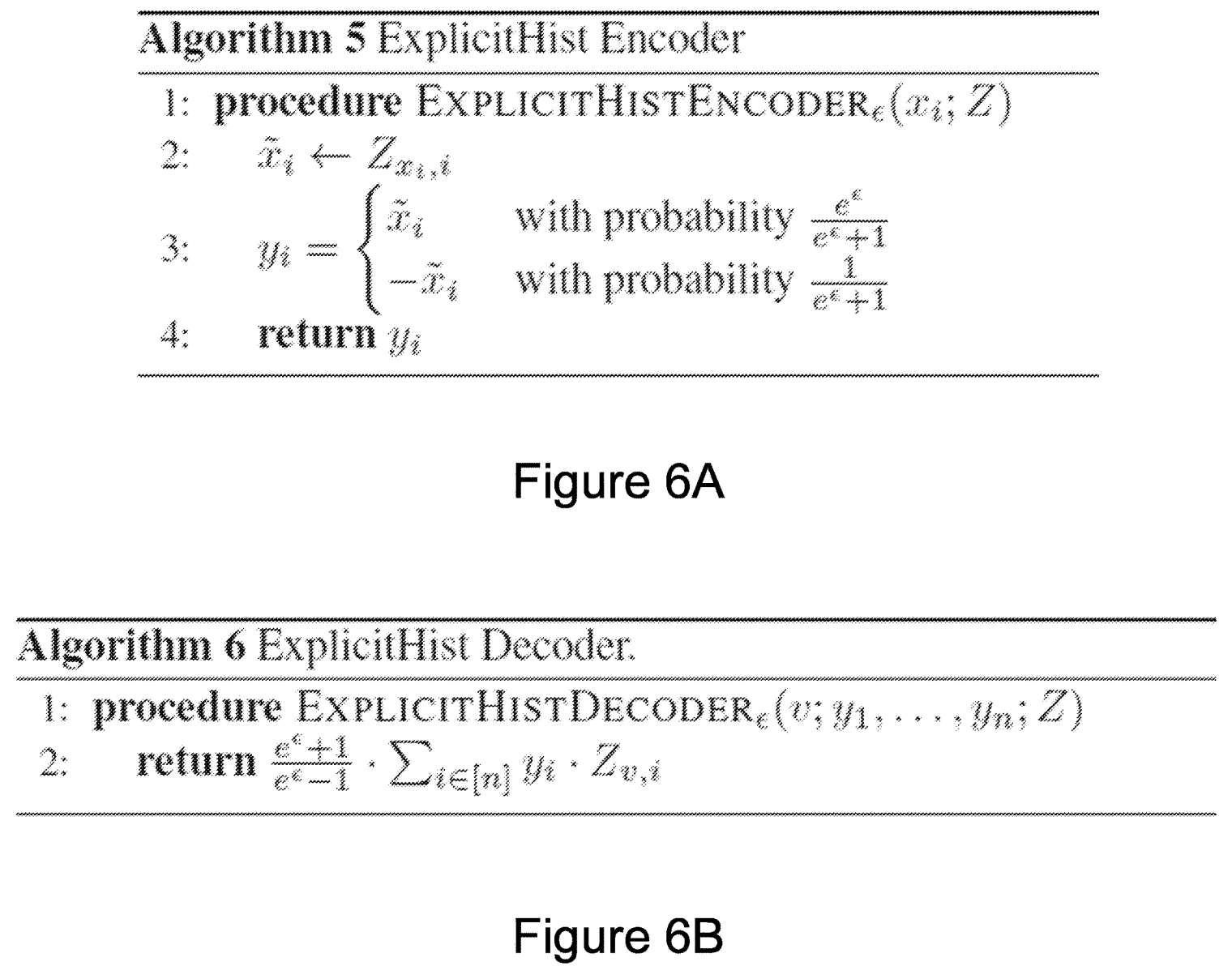

Algorithm 5 ExplicitHist Encoder

1: procedure EXPLICITHISTENCODER$_\epsilon$ $(x_i; Z)$

2: $\tilde{x}_i \leftarrow Z_{x_i, i}$

3: $y_i = \begin{cases} \tilde{x}_i & \text{with probability } \dfrac{e^\epsilon}{e^\epsilon + 1} \\ -\tilde{x}_i & \text{with probability } \dfrac{1}{e^\epsilon + 1} \end{cases}$ 4: return $y_i$

Figure 6A

Algorithm 6 ExplicitHist Decoder.

1: procedure EXPLICITHISTDECODER$_\epsilon$ $(v; y_1, \ldots, y_n; Z)$

2: return $\dfrac{e^\epsilon + 1}{e^\epsilon - 1} \cdot \sum_{i \in [n]} y_i \cdot Z_{v, i}$

Figure 6B

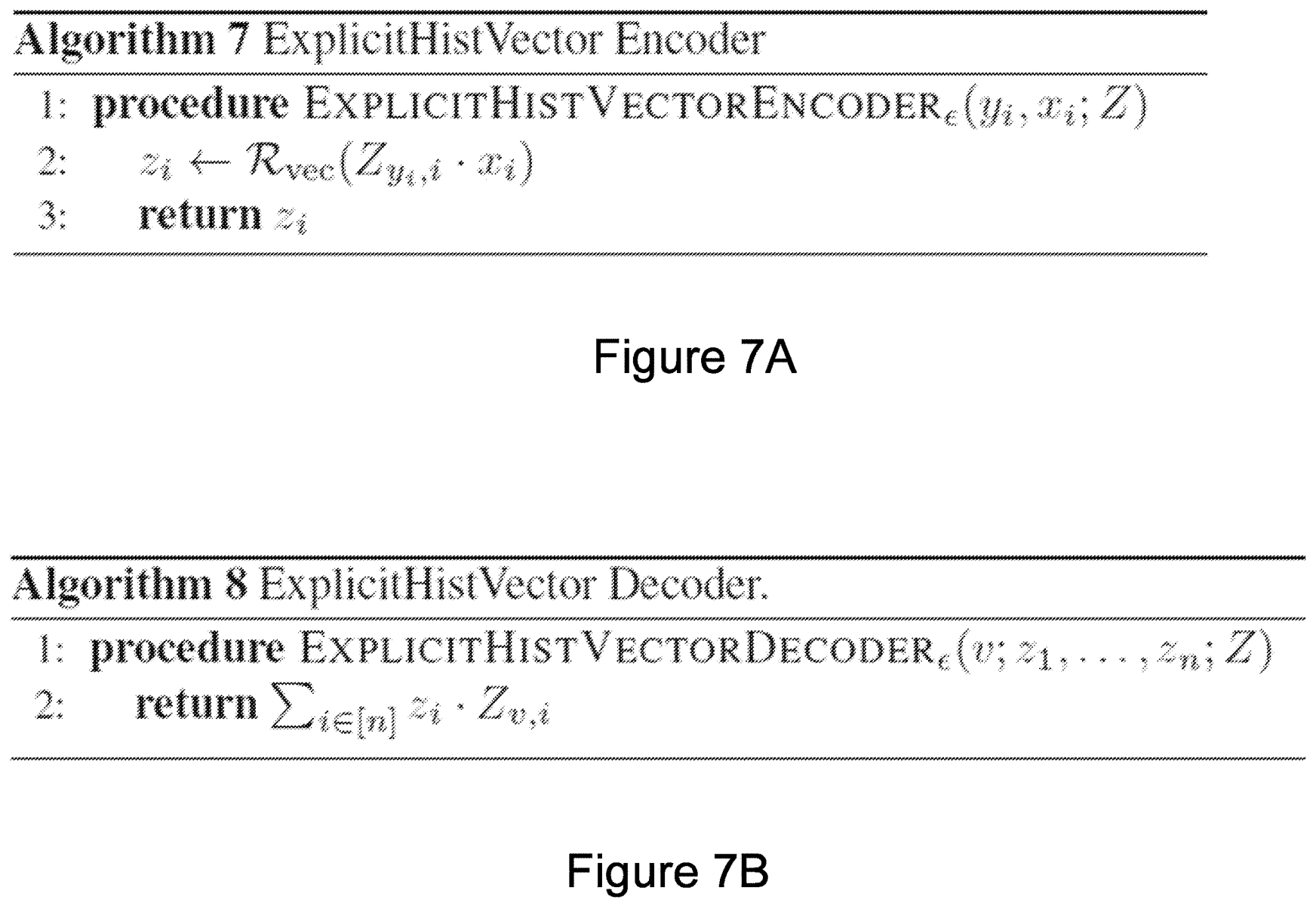

Algorithm 7 ExplicitHistVector Encoder

1: procedure EXPLICITHISTVECTORENCODER$_\epsilon\left(y_i; x_i; Z\right)$

2:    $z_i \leftarrow \mathcal{R}_{vec}\left(Z_{y_i,i} \cdot x_i\right)$

3:    return $z_i$

Figure 7A

Algorithm 8 ExplicitHistVector Decoder.

1: procedure EXPLICITHISTVECTORDECODER$_\epsilon\left(v; z_1, \ldots, z_n; Z\right)$ 2:    return $\sum_{i \in [n]} z_i \cdot Z_{v,i}$

Figure 7B

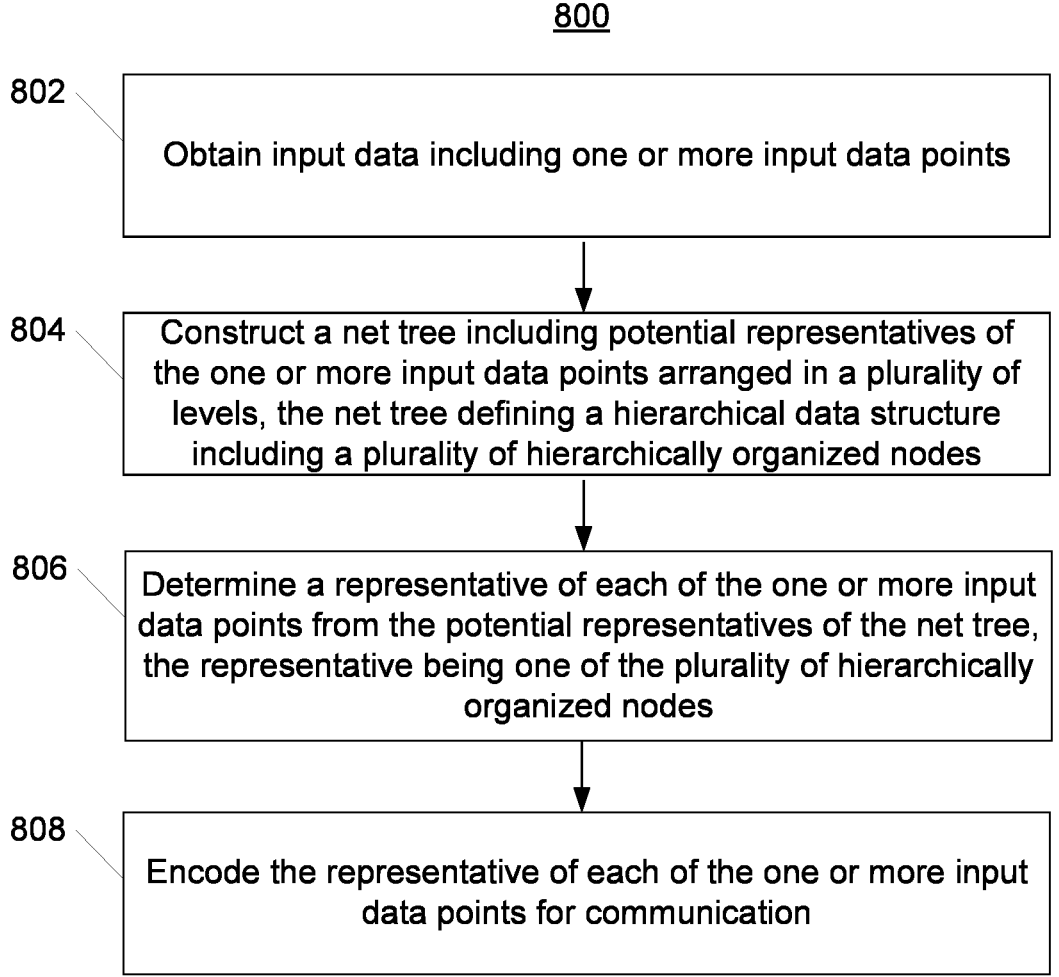

800

802 — Obtain input data including one or more input data points

804 — Construct a net tree including potential representatives of the one or more input data points arranged in a plurality of levels, the net tree defining a hierarchical data structure including a plurality of hierarchically organized nodes 806 — Determine a representative of each of the one or more input data points from the potential representatives of the net tree, the representative being one of the plurality of hierarchically organized nodes 808 — Encode the representative of each of the one or more input data points for communication

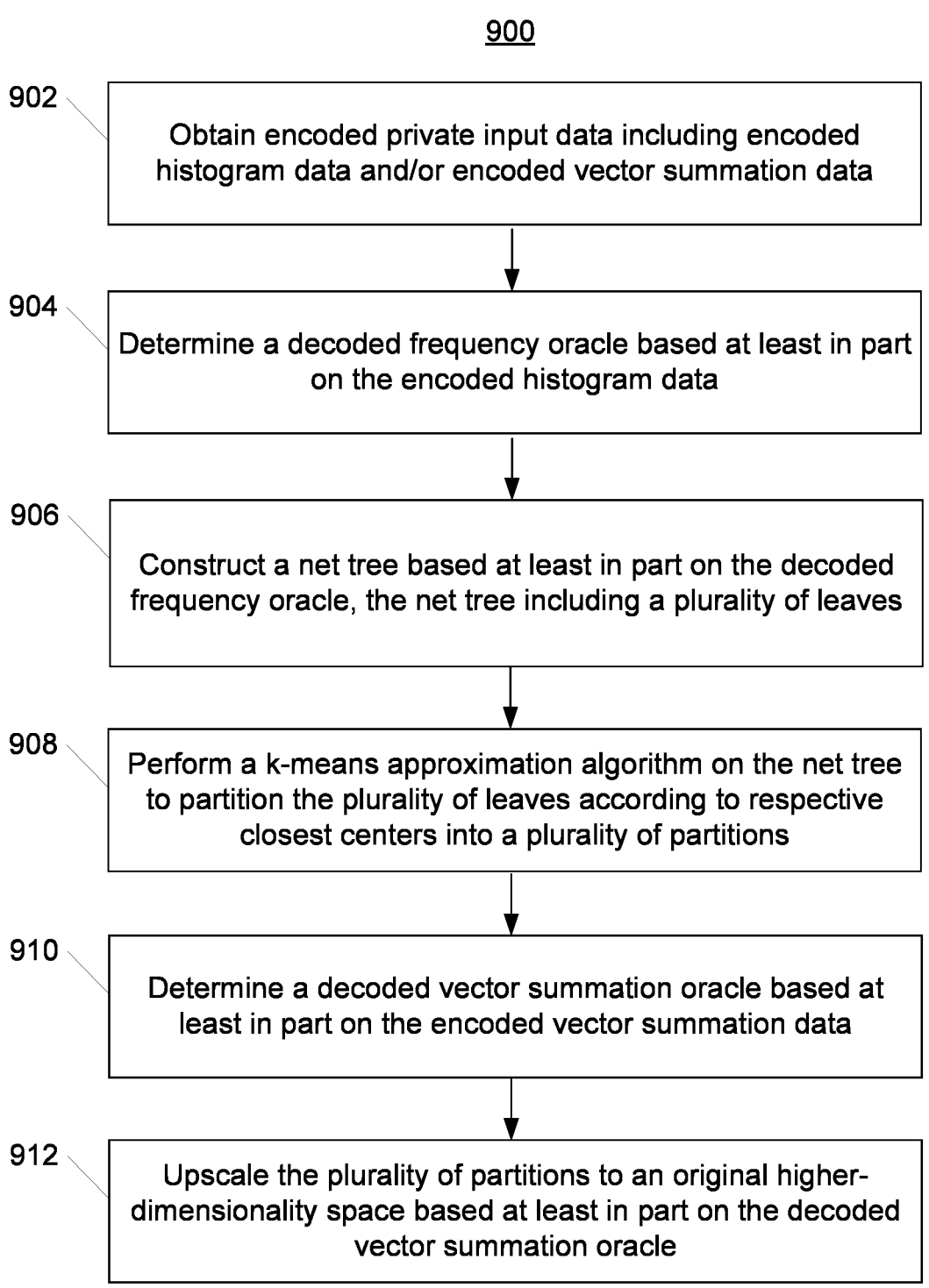

902
Obtain encoded private input data including encoded histogram data and/or encoded vector summation data 904
Determine a decoded frequency oracle based at least in part on the encoded histogram data 906
Construct a net tree based at least in part on the decoded frequency oracle, the net tree including a plurality of leaves 908
Perform a k-means approximation algorithm on the net tree to partition the plurality of leaves according to respective closest centers into a plurality of partitions 910
Determine a decoded vector summation oracle based at least in part on the encoded vector summation data 912
Upscale the plurality of partitions to an original higher-dimensionality space based at least in part on the decoded vector summation oracle

SYSTEMS AND METHODS FOR LOCALLY PRIVATE NON-INTERACTIVE COMMUNICATIONS

CROSS-REFERENCE TO RELATED APPLICATIONS

This application is based upon and claims the right of priority under 35 U.S.C. § 371 to International Application No. PCT/US2021/064371 filed on Dec. 20, 2021, which claims priority to and the benefit of U.S. Provisional Patent Application No. 63/168,533, filed Mar. 31, 2021. Applicant claims priority to and the benefit of each of such applications and incorporates all such applications herein by reference in its entirety.

FIELD

The present disclosure relates generally to systems and methods for locally private non-interactive communications. More particularly, the present disclosure relates to differentially private k-means clustering in the one-round, non-interactive local model.

BACKGROUND

Clustering, such as k-means clustering, relates to grouping or clustering a set of dimensional input points into clusters based on distance from the points to a cluster center. In k-means clustering, the points are clustered based on Euclidean distance from the points to their respective cluster center, with the goal of assigning points to candidate centers to minimize the total cost across all points, and potentially subject to other constraints.

Differential privacy has emerged as a popular definition of privacy, providing strong guarantees and mathematical rigor. Differential privacy provides that slight changes in input sets are not traceable at the output. Two predominant models of differential privacy have emerged: the central model, in which a trusted central curator encodes data to be differentially private; and distributed models such as the local model, in which there is no central curator, and instead outputs from each client are expected to be differentially private.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for encoding data for communications with improved privacy. The method can include obtaining, by a computing system comprising one or more computing devices, input data including one or more input data points. The method can include constructing, by the computing system, a net tree including potential representatives of the one or more input data points, the potential representatives arranged in a plurality of levels, the net tree including a hierarchical data structure including a plurality of hierarchically organized nodes. The method can include determining, by the computing system, a representative of each of the one or more input data points from the potential representatives of the net tree, the representative including one of the plurality of hierarchically organized nodes. The method can include encoding, by the computing system, the representative of each of the one or more input data points for communication.

Another example aspect of the present disclosure is directed to a computer-implemented method for decoding data encoded by a net tree based encoding algorithm. The method can include obtaining, by a computing system can include one or more computing devices, encoded input data including encoded histogram data. The method can include determining, by the computing system, a decoded frequency oracle based at least in part on the encoded histogram data. The method can include constructing, by the computing system, a net tree based at least in part on the decoded frequency oracle, the net tree including a plurality of leaves. The method can include performing, by the computing system, a k-means approximation algorithm on the net tree to partition the plurality of leaves according to respective closest centers into a plurality of partitions.

Another example aspect of the present disclosure is directed to a computer-implemented method for clustering input data points with differential privacy guarantees and reduced approximation ratio. The method includes obtaining, by a computing system including one or more computing devices, input data including one or more input data points. The method includes constructing, by the computing system, a net tree including potential representatives of the one or more input data points, the potential representatives arranged in a plurality of levels, the net tree including a hierarchical data structure including a plurality of hierarchically organized nodes and a plurality of mappings between the plurality of hierarchically organized nodes. The method can include determining, by the computing system, a representative of each of the one or more input data points from the potential representatives of the net tree, the representative including one of the plurality of hierarchically organized nodes.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts an example algorithm for building a net tree according to example embodiments of the present disclosure.

FIG. 3 depicts an example algorithm for computing an expansion threshold to balance for a k-means objective according to example embodiments of the present disclosure.

FIG. 4 depicts an example algorithm for encoding private input data points for noninteractive locally differentially private communications according to example embodiments of the present disclosure.

FIG. 5 depicts an example algorithm for decoding private input data points for noninteractive locally differentially private communications according to example embodiments of the present disclosure.

FIG. 6A depicts an example histogram encoder according to example embodiments of the present disclosure.

FIG. 6B depicts an example histogram decoder according to example embodiments of the present disclosure.

FIG. 7A depicts an example bucketized vector summation encoder according to example embodiments of the present disclosure.

FIG. 7B depicts an example bucketized vector summation decoder according to example embodiments of the present disclosure.

FIG. 8 depicts a block diagram of an example method for encoding private user data for noninteractive differentially private communications according to example embodiments of the present disclosure.

FIG. 9 depicts a block diagram of an example method for decoding private data encoded by a net tree based encoding algorithm according to example embodiments of the present disclosure.

Figure 1:
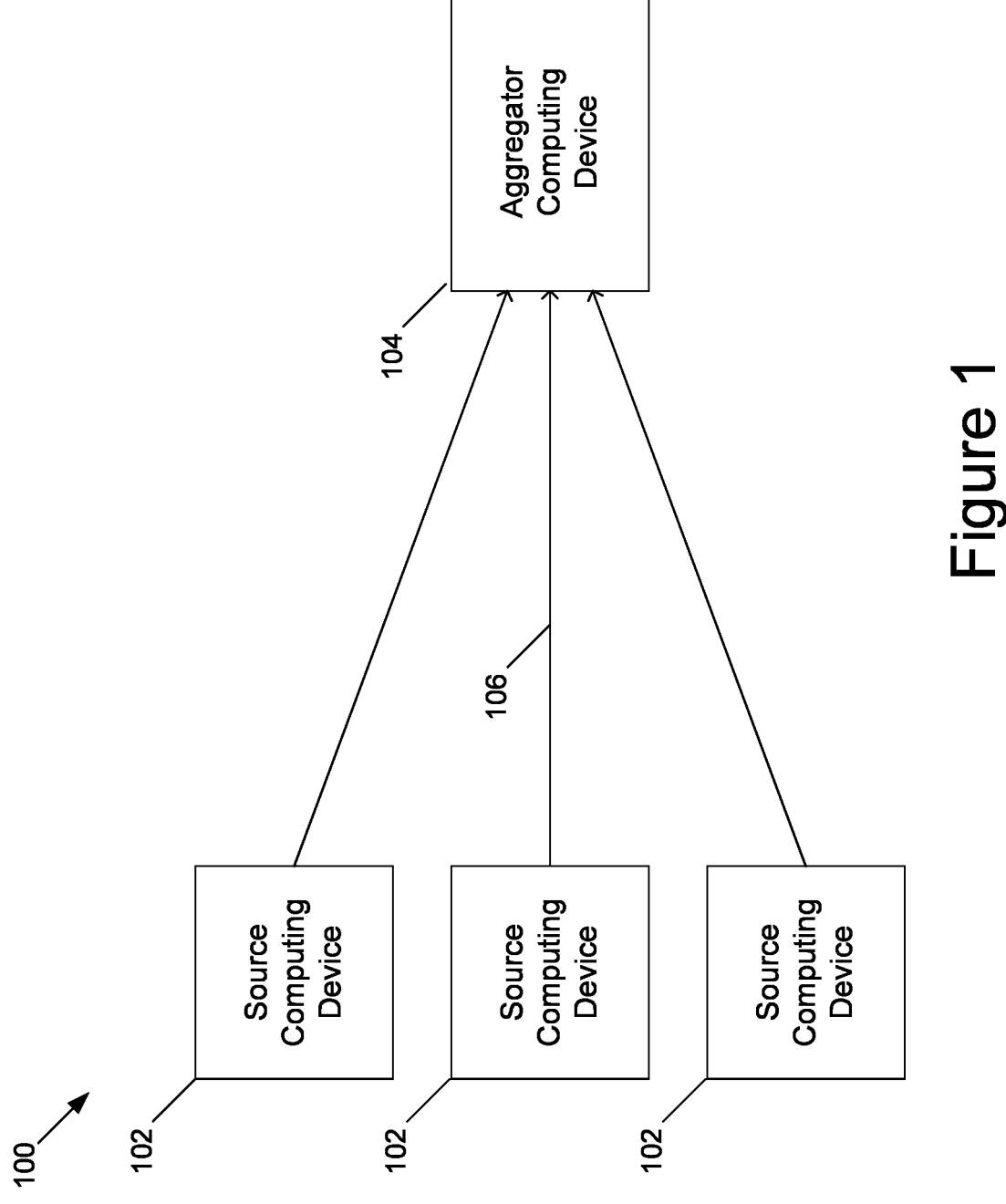
FIG. 1 depicts a block diagram of an example computing system that performs locally differentially private communications according to example embodiments of the present disclosure.

Reference numerals that are repeated across plural figures are intended to identify the same features in various implementations.

DETAILED DESCRIPTION

Generally, the present disclosure is directed to systems and methods for locally private non-interactive communications. Systems and methods according to example aspects of the present disclosure can employ a hierarchical object called a net tree to construct a private coreset of a plurality of private input points. The private coreset can then be encoded to preserve user privacy with strong differential privacy guarantees. A decoder model (e.g., at an aggregator computing device) can then run an approximation algorithm, which may not necessarily be private, on the encoded coreset. Systems and methods according to example aspects of the present disclosure can work in the non-interactive local model for differential privacy, as each source can encode all potential representatives of its respective input point(s) without requiring any interaction (e.g., any back-and-forth communication) with the aggregator.

Differential privacy (DP) can be formally defined such that, for $\varepsilon > 0$ and $\delta \in [0,1]$, a randomized algorithm $\mathcal{A}$ is $(\varepsilon,\delta)$–DP if for every pair X, X' of inputs that differ on one point and for every subset S of the algorithm's possible outputs, it holds that $\Pr[\mathcal{A}(X) \in S] \le e^{\varepsilon} \cdot \Pr[\mathcal{A}(X') \in S] + \delta$. When $\delta = 0$, the algorithm is said to be $\varepsilon$-DP. Similarly, the local model of differential privacy can be formally defined as follows. Let n be the number of users, let $X = \{x_1, \ldots x_n\}$ and let the input $x_i$ be held by the ith user. An algorithm in the local DP model consists of an encoder whose input is the data held by one user and whose output is a sequence of messages, and a decoder, whose input is the concatenation of the messages from all the encoders and whose output is the output of the algorithm. A pair (Enc,Dec) is $(\varepsilon,\delta)$-DP in the local model if for any input $X = (x_1, \ldots, x_n)$, the algorithm $\mathcal{A}(X) := (Enc(x_1), \ldots, Enc(x_n))$ is $(\varepsilon,\delta)$-DP.

In particular, systems and methods according to example aspects of the present disclosure can provide for differentially private and/or noninteractive (e.g., one-round) communications between a plurality of source computing devices, such as those associated with a user (e.g., a mobile device, laptop, etc.) or a client device (e.g., in communication with a central server), and an aggregator computing device (also referred to as an analyzer). In distributed models of differential privacy, such as the local model and/or shuffled model of differential privacy, the aggregator device may not be trustworthy. For instance, it is assumed that the aggregator itself and/or devices capable of intercepting transmissions between the source computing devices and aggregator computing device are host to adverse parties or otherwise should not be privy to private user data. Because of this, in the distributed models, it is required that each transmission from the source computing devices to the aggregator computing device is differentially private.

Various approaches have been proposed to provide distributed differential privacy. Some of these approaches utilize an encoder model together with k-means clustering on the input data. Algorithms for performing k-means clustering are generally NP-hard and/or run with large approximation ratios. Furthermore, some approximation algorithms for k-means clustering are incompatible with certain types of differential privacy models, such as distributed differential privacy. Additionally, many existing differentially private algorithms are interactive, meaning that they require multiple rounds of communication between sources and aggregators.

Systems and methods according to example aspects of the present disclosure, however, can provide for solutions to these and other challenges related to approximating k-means and/or providing differentially private and/or noninteractive communications. For instance, systems and methods according to example aspects of the present disclosure can provide for a k-means approximation algorithm that provides an approximation ratio that is arbitrarily close to approximation ratios of non-private algorithms. Additionally, systems and methods according to example aspects of the present disclosure can provide noninteractive differentially private communications that can be performed with only a single communication from the source to the aggregator. Additionally, systems and methods according to example aspects of the present disclosure can be applied to various differentially private models, including, for instance, the local model, shuffled model, and/or other distributed models.

According to example aspects of the present disclosure, a computing system including one or more computing devices can obtain private data including one or more input data points. For instance, the computing system can be or can include a source computing device. The source computing device may be a user computing device operated by a user, such as a mobile device, desktop computer, wearable computing device, or any other suitable computing device. The private data (e.g., the one or more input data points) can be user data. As an example, the private data can be or can include vector or other tensor data. For instance, the input data points can be points (e.g., represented by vectors or other tensors) in a d-dimensional space, or having a dimensionality d.

Example aspects of the present disclosure can provide for systems and methods for constructing a net tree representative of the private data (e.g., including the input data points). An approximate frequency (e.g., a frequency oracle)

can be associated with each node in the net tree. The approximate frequency can provide an approximation of a number of input data points for which a given node is a representative of. For instance, considering each node in a tree as a bucket, where each input data point contributes to a bucket, the approximate frequency can approximate a number of contributions to the bucket. Net trees essentially provide for constructing coresets of inputs, especially for cases where dimension of the inputs is small. As used herein, A weighted point set S' is a $(k,\gamma,t)$-coreset of a weighted point set S if, for every set $C\subseteq \mathbb{B}^d$ of k centers, it holds that $(1-\gamma)\cdot cost_S(C)-t\le cost_{S'}(C)\le(1+\gamma)\cdot cost_S(C)+t$. When k is clear from context, such an S' is referred to as just a $(\gamma,t)$-coreset of X. A coreset can serve as a good approximation of the original weighted point set (e.g., an original set of input data points).

For instance, according to example aspects of the present disclosure, the computing system can construct a net tree including potential representatives of the one or more input data points. The potential representatives can be arranged in a plurality of levels. For instance, the net tree can be or can include a hierarchical data structure including a plurality of hierarchically organized nodes. The tree may additionally include a plurality of mappings between the plurality of hierarchically organized nodes.

The computing system can determine a representative of each of the one or more input data points from potential representatives of the net tree. The representative can be one of the plurality of hierarchically organized nodes. For instance, the representative of an input data point of the one or more input data points can be a closest potential representative to the input data point. The closest potential representative to the input data point can include a potential representative having a smallest (e.g., Euclidean) distance to the input data point relative to each of the other potential representatives in the net tree.

For instance, according to example aspects of the present disclosure, a net tree can include a plurality of nets. The plurality of nets can form respective levels of the tree, wherein the nodes at each level of the tree correspond to elements in a respective net of the plurality of nets. The net tree can be constructed based at least in part on a (e.g., approximate) frequency oracle on the plurality of nets. For instance, the frequency oracle can approximate, at each node of the net tree, a number of input data points (e.g., representative of a number of sources) that the node is a representative of. As another example, the frequency oracle can approximate, for each representative, a number of input data point sources that provide points for which the representative is assigned. A complete net tree is defined as a net tree wherein a number of layers in the tree is one greater than a number of nets in the plurality of nets. For instance, the one additional layer may be a root layer. For example, the net tree may be rooted at zero.

Given a family of nets $\mathcal{L}_1, \ldots, \mathcal{L}_T$, a complete net tree is defined as a net tree with (T+1) levels. For each $i\in \{0, \ldots, T\}$, the nodes in level i include (e.g., exactly) the elements of $\mathcal{L}_i$. Furthermore, for all $i\in[T]$, the parent of a given node $z\in \mathcal{L}_i$ is the closest node in the prior layer i−1, or $\Psi_{i-1}(z)\in \mathcal{L}_{i-1}$. An incomplete net tree refers to a subtree of the complete net tree (e.g., rooted at zero). Each node in the incomplete net tree must either be a leaf or all children of the node must be present in the incomplete net tree.

Furthermore, given a point $x\in \mathbb{B}^d$, its potential representatives are the T+1 nodes $\Psi_T(X), \Psi_{T-1}(\Psi_T(x)), \ldots, \Psi_0(\ldots (\Psi_T(x)) \ldots)$ in the complete net tree. For instance, the potential representatives form a mapping from the layer T down to the root layer at zero. The representative of x in a net tree $\mathcal{T}$, denoted by $\Psi_T(x)$, is the unique leaf of $\mathcal{T}$ that is a potential representative of x. Similarly, given a frequency oracle $\hat{f}$ on domain $\mathcal{L}_1 \cup \ldots \cup \mathcal{L}_t$, the representative point set of a tree $\mathcal{T}$ (and frequency oracle $\hat{f}$), denoted by $S_\mathcal{T}$, is the weighted point set where every leaf $z\in leaves(\mathcal{T})$ receives a weight of $\hat{f}_z$. Each input data point (e.g., from a source) can be assigned to a representative leaf in the net tree.

In some implementations, the plurality of nets can be or can include efficiently decodable nets. For instance, a net tree can include a plurality of efficiently decodable nets. Formally let $\mathbb{B}^d(x,r)$ denote the closed radius-r ball around a point (e.g., a vector) x, i.e., $\mathbb{B}^d(x,r)=\{y\in\mathbb{R}^d \mid \|x-y\|\le r\}$, where d denotes the dimension of x. Let $\mathbb{B}^d=\mathbb{B}^d(0,1)$, also called the unit ball. Furthermore, let $\mathcal{L}\subseteq\mathbb{B}^d$ be a finite set. Its covering radius, denoted $\rho(\mathcal{L})$, is defined as $\max_{x\in\mathbb{B}^d}\min_{y\in\mathcal{L}}\|x-y\|$. Its packing radius, denoted $\gamma(\mathcal{L})$, is defined as the largest $\gamma$ such that the open balls around each point of $\mathcal{L}$ of radius $\gamma$ are disjoint. $\mathcal{L}$ is said to be a $(\rho,\gamma)$-net if $\rho(\mathcal{L})\le\rho$ and $\gamma(\mathcal{L})\ge\gamma$. An efficiently decodable net is a net such that, given any point, points in the net that are sufficiently close to the point can be found in exp(O(d)) time. For instance, given any $\rho>0$, there exists a $(\rho,\rho/3)$-net $\mathcal{L}$ such that, for any given point $x\in\mathbb{B}^d$ and any $r\ge\rho$, all points in $\mathbb{B}^d(x,r)\cap\mathcal{L}$ can be found in time $(1+r/\rho)^{O(d)}$.

When constructing a net tree, the deeper the tree is, the closer the representative of an input point will be to the input point itself. Additionally, noise is added at the number of nodes assigned to each leaf to achieve privacy. Because of this, it can be desirable to balance the number of leaves in a tree. Too many leaves will result in a greater error introduced by the noise, while too few leaves results in input points being too far from their representatives, resulting in increased error. For instance, including too many nodes in the tree results in too many nodes contributing to the additive error associated with differential privacy. Additionally, including too few nodes will result in many nodes being at a low level, resulting in a large representation error introduced by distances between representatives and input points, and thus a larger overall error. Example aspects of the present disclosure can provide for balancing between these two errors to optimize for an overall k-means objective.

To balance for these errors, nodes of the net tree can be expanded throughout the levels of the tree with regard to an expansion threshold (referred to herein as $\tau$) for a net tree. The expansion threshold can be indicative of a number of nodes to expand at each level of the net tree. The expansion threshold can effectively balance the additive error associated with including nodes against the accuracy lost by including too few nodes. For instance, the nodes at a first level can be ranked according to any suitable criteria, such as approximate frequency. A number of highest ranking nodes in the first level can be expanded to produce a second level of the tree, where the number of highest ranking nodes is equal to the expansion threshold. An example threshold computation algorithm is given in Algorithm 2 (depicted in FIG. 3 and below). For instance, constructing, by the computing system, the net tree including potential representatives of the one or more input data points can include determining, by the computing system, an expansion threshold. Additionally, constructing the net tree can include identifying, by the computing system, a number of one or more highest-ranking nodes in the net tree at a first level in the net tree. The number of identified highest-ranking nodes can be equal to the expansion threshold. For instance, the computing system can identify $\tau$ highest-ranking nodes. Constructing the tree can then include expanding, by the computing system, the one or more highest-ranking nodes at a second level in the net tree. For instance, the selected nodes can be expanded by having children at the second level (e.g., as opposed to being a leaf node).

---

| Algorithm 2 Computing the Threshold. |
| --- |

| Oracle Access: | Frequency Oracle $\tilde{f}$ on $\mathcal{L}_0 \cup \ldots \cup \mathcal{L}_T$ |
| --- | --- |
| Parameters: | $a, \Gamma \in \mathbb{N}$ |
| Inputs: | Nodes $z^1, \ldots, z^m$ from the same level of a net tree |

| 1: | procedure ComputeThreshold$_{a,\Gamma}^{\tilde{f}}$ |
| 2: | for $j \in [\min\{\Gamma, \lfloor m/ka \rfloor\}]$ |
| 3: | if $\sum_{i=1}^{m-(j-1)ka} f_{z^i} \leq 2 \cdot \sum_{i=1}^{m-jka} f_{z^i}$ |
| 4: | return $(j-1)ka$ |
| 5: | return min $\{m, \Gamma ka\}$ |

---

In some implementations, the expansion threshold can be based at least in part on an optimal transport cost, such as an optimal transport cost between the one or more input data points and the potential representatives. For instance, the optimal transport cost can result from a solution to an optimal transport problem, such as Monge's optimal transport problem. The optimal transport problem seeks to find a map that transports a first measure on a metric space to a second measure on the metric space, while minimizing the cost. The cost can be any suitable cost, and may be, for example, defined in terms of a total mass moved multiplied by a function of a distance moved. Such a mapping is not guaranteed, such as in cases where masses are different. In some implementations, mismatched masses can be allowed but compensated for by penalizing based on an L1 difference. For instance, Let S, S' be weighted point sets on $\mathbb{B}^d$. The generalized $$(L_2^2)$$

Monge's transport cost of a mapping $\Psi: \mathbb{B}^d \to \mathbb{B}^d$ is thus defined as $$mt(\Psi, S, S') := \sum_{y \in \mathbb{B}^d} w_S(y) \cdot \|\Psi(y) - y\|^2 + \sum_{x \in \mathbb{B}^d} |w_S(\Psi^{-1}(x)) - w_{S'}(x)|.$$

The optimal generalized $$(L_2^2)$$

Monge's transport cost from S to S' is then defined as $$mt(S, S') = \min_{\Psi:\mathbb{B}^d \to \mathbb{B}^d} mt(\Psi, S, S').$$

It is noted that the minimizer $\Psi$ always exists because the weighted sets S, S' have finite supports. A useful property of optimal transport is that if the optimal transport cost between S, S' is small relative to the optimal k-means objective, then S' is a good coreset for S.

Additionally, the expansion threshold can be based at least in part on a minimum cost of a set of centers C and a multiset X, denoted $$OPT_X^k,$$

where the minimum cost is based on distance between the set of centers and elements in the multiset (e.g., a minimum-cost clustering solution). For instance, in some cases, the minimum cost can be unknown, and the expansion threshold can be based on a lower bound of the minimum cost. As an example, in some implementations, the expansion threshold is based at least in part on a lower bound on a minimum cost between the one or more input data points and the potential representatives. Formally, let a, b, $k \in \mathbb{N}$ and $r \in \mathbb{R}_{\geq 0}$. Let S be a weighted point set, and $T_1, \ldots, T_{ka+b} \subseteq \mathbb{R}^d$ be any ka+b disjoint sets such that for any point $c \in \mathbb{R}^d$ it holds that $|\{i \in [ka+b] | \mathbb{B}^d(c,r) \cap T_i \neq \emptyset\}| \leq a$. Then, $$OPT_S^k \geq r^2 \cdot \text{bottom}_b(w_S(T_1), \ldots, w_S(T_{ka+b})).$$

Then, for any $\theta > 0$, let $r = \theta \cdot 2^{-i}$ and $a = [(1+(2+\theta)/\gamma)^d]$. Let $b \in \mathbb{N}$. Let (ka+b) level-i nodes $\tilde{z}^1, \ldots, \tilde{z}^{ka+b}$ exist in a net tree $\mathcal{T}$. Furthermore, let S be any multiset and f the frequency of S. Then, $$OPT_{S \cap \Psi_{\mathcal{T}}^{-1}(\{z^1,\ldots,z^{ka+b}\})}^k \geq r^2 \cdot \text{bottom}_b(f_{\tilde{z}^1}, \ldots, f_{\tilde{z}^{ka+b}}).$$

For instance, $r^2 \cdot \text{bottom}_b(f_{\tilde{z}^1}, \ldots, f_{\tilde{z}ka+b})$ can act as a lower bound on the minimum cost $$OPT_S^k.$$

The additive error introduced by this lower bound can add up over multiple levels of a net tree. To avoid this, the additive error should only be counted at the optimal of the weighted point set corresponding to leaves in a particular level, so the error is not double counted.

Net trees provide for certain properties that are useful according to example aspects of the present disclosure. For instance, one property of a net tree is that a potential representation of point x at level i cannot be undesirably far from x. For instance, for any $x \in \mathbb{B}^d$ and $i \in \{0, \ldots, T\}$, the distance between the point x and all potential representatives is bounded by an exponentially decreasing factor at deeper layers, or $\|x - \Psi_i( \ldots (\Psi_T(x)) \ldots )\| \leq 2^{1-i}$. A second property of net trees is that the number of children at each node z is small (e.g., bounded by packing radius and/or dimension). For instance, for any $z \in \mathcal{L}_0 \cup \ldots \cup \mathcal{L}_{T-1}$, $|children(z)| \leq B := (1+2/\gamma)^d$. A third property of net trees is that there is an upper bound on the optimal transport cost from a given weighted point set to a representative point set created via a net tree T. In particular, $$mt(\Psi_{\mathcal{T}}, S, S_{\mathcal{T}}) \le \sum_{z \in leaves(\mathcal{T})} \left( f_z \cdot \left( 4\rho_{level(z)}^2 \right) + |f_z - \tilde{f}_z| \right),$$

where, for a weighted point set S and a net tree $\mathcal{T}$, $f_z$ denotes the frequency of S on a leaf $z \in$ leaves($\mathcal{T}$), i.e., $$f_z = w_S \left( \Psi_{\mathcal{T}}^{-1}(z) \right),$$

and $S_{\mathcal{T}}$ denotes the representative point set constructed from $\mathcal{T}$ and frequency oracle $\tilde{f}$.

Another important property of a net tree $\mathcal{T}$ output by the tree construction Algorithm 1 (shown in FIG. 2 and below) is that its representative point set is a good coreset of the underlying input. For instance, Let $\xi \in (0,1)$. Suppose that the frequency oracle $\tilde{f}$ is $\eta$-accurate on every element queried by the algorithm. Let $\mathcal{T}$ be the tree output by Algorithm 1 where $\Gamma = \lceil \log n \rceil$, $T = \lceil 0.5 \log n \rceil$, $$\theta = 8\sqrt{\frac{1 + 2/\xi}{\xi}},$$

and $a = \lceil (1+(2+\theta)/\gamma)^d \rceil$. Let $N_{\mathcal{T}} = 2^{O_\xi(d)} \cdot k \cdot (\log^2 n)$. Then, the number of nodes in $\mathcal{T}$ is $N_{\mathcal{T}}$. Furthermore, this holds regardless of the frequency oracle accuracy. Additionally, given these conditions, $$mt(\Psi_{\mathcal{T}}, S, S_{\mathcal{T}}) \le \frac{\xi}{8(1 + 2/\xi)} \cdot OPT_S^k + \eta \cdot O(N_{\mathcal{T}}).$$

Additionally, given these conditions, $S_{\mathcal{T}}$ is a $(\xi, \eta \cdot O(N_{\mathcal{T}}))$-coreset of S. Moreover, the tree construction algorithm runs in time poly($N_{\mathcal{T}}$) multiplied by the time to query $\tilde{f}$.

---

Algorithm 1 Building the Net Tree

Oracle Access: Frequency oracle $\tilde{f}$ on $\mathcal{L}_0 \cup \ldots \cup \mathcal{L}_T$
1:     procedure BUILDTREE$^{\tilde{f}}$
2:       $\mathcal{T} \leftarrow$ root node z = 0 at level 0
3:       for i = 0,..., T − 1
4:         $z_i^1, \ldots, z_i^{m_i} \leftarrow$ level − i nodes sorted in
5:         non-decreasing order of $\tilde{f}_z$
6:         $\tau_i \leftarrow$ COMPUTETHRESHOLD$_{a,\Gamma}^{\tilde{f}} (z_i^1, \ldots, z_i^{m_i})$
7:         for j= 0,..., $\tau_i$ − 1
8:           Add children( $z_i^{m_i-j}$ ) to $\mathcal{T}$
9:       return $\mathcal{T}$

---

Additionally, according to example aspects of the present disclosure, the computing system can encode the representative of each of the one or more input data points for noninteractive differentially private communication. For instance, the representatives of each input data point can make up a coreset that is representative of the private data. These representatives can be encoded by the source computing system(s) and transmitted to the aggregator computing system, which can then decode the encoded representatives while providing differential privacy guarantees at the source computing devices. An example algorithm for differentially private, noninteractive encoding is given in Algorithm 3 (depicted in FIG. 4 and below).

---

Algorithm 3 Encoding Algorithm for k-means.

Input:      Point $x_i \in \mathbb{B}^d$ of user i.
Parameters:   Privacy parameters $\epsilon$, $\delta$, nets $\mathcal{L}_1, \ldots, \mathcal{L}_T$, d'-dimensional subspace P, and $\Lambda > 0$.
Subroutines:   Encoders Enc$^{hist}$, Enc$^{Vec}$ for generalized histogram and bucketized vector summation.
1:     procedure KMEANSENCODER$_{\epsilon,\delta,\Lambda,P,\mathcal{L}_1,\ldots,\mathcal{L}_{T}(x_i)}$
2:       $\tilde{x}_i \leftarrow \Pi_P(x_i)$
3:       if $\|\tilde{x}_i\| \le 1/\Lambda$
4:         $x_i' = \Lambda \tilde{x}$
5:       else
6:         $x_i' = 0$
7:       $y_i^T \leftarrow$ Closest point to $x_i'$ in $\mathcal{L}_T$
8:       for j = T − 1, . . . , 1
9:         $y_i^T \leftarrow$ Closest point to $y_i^{j+1}$ in $\mathcal{L}_j$
10:      $e_i^h \leftarrow Enc_{\left(\frac{\epsilon}{2}, \frac{\delta}{2}\right)}^{hist} \left( \{ y_i^1, \ldots, y_i^T \} \right)$
11:      $e_i^y \leftarrow Enc_{\left(\frac{\epsilon}{2}, \frac{\delta}{2}\right)}^{vec} \left( \{ y_i^1, \ldots, y_i^T \}, x_i \right)$
12:      return $(e_i^h, e_i^y)$

---

For instance, in some implementations, encoding, by the computing system, the representative of each of the one or more input data points for noninteractive differentially private communication can include encoding, by the computing system, the representative by a generalized bucketized vector summation encoder model. In some implementations, the vector summation encoder model can include a vector encoding of a dot product of a shared uniform random component and a potential representative. As an example, the generalized bucketized vector summation encoder model can include a mathematical model configured such that $z_i \leftarrow \mathcal{R}_{vec}(Z_{y_i,i}, x_i)$. Furthermore, one example generalized bucketized vector summation encoder model is given in Algorithm 7 depicted in FIG. 7A. The generalized bucketized vector summation encoder can encode the representatives with an input vector x.

Additionally, in some implementations, encoding, by the computing system, the representative of each of the one or more input data points for noninteractive differentially private communication can include encoding, by the computing system, the representative by a generalized histogram encoder model. In some implementations, the generalized histogram encoder model produces an output based on a shared uniform random component, wherein the output is positive with probability $$\frac{e^\varepsilon}{e^\varepsilon + 1}$$

and negative with probability $$\frac{1}{e^\varepsilon + 1},$$

where $\varepsilon$ is a hyperparameter of differential privacy. As an example, in some implementations, the generalized histogram encoder model can include a mathematical model configured such that:

$$\hat{x}_i \leftarrow Z_{x_i,i} \text{ and } y_i = \begin{cases} \hat{x}_i & \text{with probability } \dfrac{e^{\varepsilon}}{e^{\varepsilon}+1} \\ -\hat{x}_i & \text{with probability } \dfrac{1}{e^{\varepsilon}+1} \end{cases}$$

Furthermore, one example generalized histogram encoder model is given in Algorithm 6 depicted in FIG. 6A.

In some implementations, prior to determining a representative of each of the one or more input data points from the potential representatives of the net tree, the computing system can project the one or more input data points to a random subspace. The random subspace can be based on shared randomness between the computing device and other computing devices, such as other source computing devices and/or the aggregator computing device. This projection can be performed to d=O(log k) dimensions while maintaining an objective for any given partition. For instance, for every $0<\hat{\beta}, \alpha<1$ and $k \in \mathbb{N}$, this exists $d'=O_{\alpha}(\log(k/\beta))$ such that the following holds. Let P be a random d'-dimensional subspace of $\mathbb{R}^d$ and $\Pi_P$ denote the projection from $\mathbb{R}^d$ to P. With probability $1-\hat{\beta}$, the following holds for all partitions $\phi$: $\mathbb{B}^{d'} \rightarrow [k]$:

$$\frac{1}{1+\bar{\alpha}} \le \frac{d \cdot \text{cost}_{\Pi_{P(S)}}(\phi)}{d' \cdot \text{cost}_S(\phi \circ \Pi_P)} \le 1 + \bar{\alpha}.$$

In addition, subsequent to projecting the one or more input data points to the random subspace, the computing device can scale the projected input data points to a subspace having reduced dimensionality. For instance, representatives in the net tree can be computed for the projected input data points in the reduced dimensionality subspace. Random projections and dimensionality reduction can remove an exponential dependency on d from the additive error, which can improve performance of the encoder.

In some implementations, the plurality of nets can be replaced with locality-sensitive hashing. For instance, given LSH $g_1, \ldots, g_T$, the level-i representation of x becomes $z_i=(g_1(x), \ldots, g_T(x))$. In this sense, the tree bears a strong resemblance to LSH forests. Any suitable hashes can be employed, such as SimHash in which a random vector $v_i$ is chosen and $g_i(x)$ is the sign of $<v_i,x>$. In some implementations, the input data points may not be randomly projected to a lower-dimensionality subspace, as LSH is a form of dimensionality reduction. Additionally due to this, it is also possible directly compute the approximate centers of all the nodes in the tree and then use a non-private algorithm (e.g., k-means++) to compute the k centers on this privatized dataset.

In addition to providing for encoding the private data, systems and methods according to example aspects of the present disclosure can provide a computer-implemented method for decoding private data encoded by a net tree based encoding algorithm. For instance, a computing system including one or more computing devices can obtain encoded private input data. The encoded private input data can be received from one or more (e.g., a plurality of) source computing devices. Additionally and/or alternatively, the computing system can be or can include an aggregator computing device. For instance, the aggregator computing device can aggregate the differentially private encoded input data from a plurality of sources while maintaining privacy of the individual sources. An example algorithm for decoding the private data is given by Algorithm 4 (shown in FIG. 5 and below).

| Algorithm 4 Decoding Algorithm for k-means. | |
|---|---|
| Input: | Encoded inputs $e_1^h, e_1^v, \ldots, e_n^h, e_n^v$. |
| Parameters: | Privacy parameters $\epsilon, \delta$, approximation algorithm $\mathcal{A}$ for k-means. |
| Subroutines: | Decoders $\text{Dec}^{hist}, \text{Dec}^{Vec}$ for generalized histogram and bucketized vector summation. |
| 1: | procedure KMEANSDECODER |
| 2: | $\hat{f} \leftarrow$ frequency oracle from $\text{Dec}^{hist}_{(\frac{\epsilon}{2},\frac{\delta}{2})}(e_1^h, \ldots, e_n^h)$ |
| 3: | $\hat{v} \leftarrow$ vector sum oracle from $\text{Dec}^{vec}_{(\frac{\epsilon}{2},\frac{\delta}{2})}(e_1^v, \ldots, e_n^v)$ |
| 4: | $\mathcal{T} \leftarrow$ BUILDTREE$^{\hat{f}}$ |
| 5: | $\{c_1', \ldots, c_k'\} \leftarrow \mathcal{A}(\mathbf{S}_{\mathcal{T}})$ |
| 6: | $\phi_* \leftarrow$ mapping leaves $(\mathcal{T}) \rightarrow [k]$ where $\phi_*(z) = j$ iff $c_j'$ is closest to z (with ties broken arbitrarily) |
| 7: | for j = 1, . . . , k |
| 8: | $\bar{v}^j \leftarrow 0$ |
| 9: | $\bar{n}^j \leftarrow 0$ |
| 10: | for z $\in \phi_*^{-1}(j)$ |
| 11: | $\bar{v}^j \leftarrow \bar{v}^j + \hat{v}_z$ |
| 12: | $\bar{n}^j \leftarrow \bar{n}^j + \hat{f}_z$ |
| 13: | $\bar{c}^j = \bar{v}^j/\max\{\hat{1}, \bar{n}^j\}$ |
| 14: | if $\|\bar{c}^j\| \le 1$ |
| 15: | $c_j \leftarrow \bar{c}^j$ |
| 16: | else |
| 17: | $c_j \leftarrow \bar{c}^j/\|\bar{c}^j\|$ |
| 18: | return $\{c_1, \ldots, c_k\}$ |

The encoded private input data can include encoded histogram data. For instance, the encoded histogram data can be encoded by the generalized histogram encoder model (e.g., as described in Algorithm 5 shown in FIG. 6A and below). The computing system can determine a decoded frequency oracle based at least in part on the encoded histogram data. In some implementations, determining, by the computing system, the decoded frequency oracle is performed at least in part by summing the encoded histogram data according to $$\frac{e^{\varepsilon}+1}{e^{\varepsilon}-1} \cdot \sum_{i\in[n]} y_i \cdot Z_{v,i}.$$

$\sum_{i\in[n]} y_i \cdot Z_{v,i}.$

| Algorithm 5 ExplicitHist Encoder | |
|---|---|
| 1: | procedure EXPLICITHISTENCODER$_\epsilon$ (x$_i$; Z) |
| 2: | $\hat{x}_i \leftarrow Z_{x_i,i}$ |
| 3: | $y^i = \begin{cases} \hat{x}_i \text{ with} \\ \text{ probability } \dfrac{e^{\varepsilon}}{e^{\varepsilon}+1} \\ -\hat{x}_i \text{ with} \\ \text{ probability } \dfrac{1}{e^{\varepsilon}+1} \end{cases}$ |
| 4: | return y$_i$ |

As one example, an example histogram decoder model that can be used to decode the decoded frequency oracle is given in Algorithm 6 (shown in FIG. 6B and below). The combination of the generalized histogram encoder model and the decoder model can be an $(O(\sqrt{n\log(|Y|/\beta)}/\varepsilon), \beta)$-accurate ε-DP algorithm for a histogram in the local model. Moreover, it can be made to run in time poly(n, log|Y|).

| Algorithm 6 ExplicitHist Decoder |
| --- |
| 1:      procedure EXPLICITHISTDECODER$_\epsilon$ (v; $y_1, \ldots, y_n$; Z) |
| 2:      return $\dfrac{e^\epsilon + 1}{e^\epsilon - 1} \cdot \sum_{i \in [n]} y_i \cdot Z_{v,i}$ |

The computing system can then construct a net tree based at least in part on the decoded frequency oracle. For instance, the computing system can attempt to recreate the net tree that was constructed for encoding the encoded private input data at the source, based on the decoded frequency oracle. To decode the encoded data, the computing system can first use the encoded histogram to build a frequency oracle, from which the computing system can construct a net tree $\mathcal{T}$ using the algorithms described herein (e.g., Algorithm 1 of FIG. 2).

The computing system can then run any suitable approximation algorithm $\mathcal{A}$ for k-means on the representative set of the net tree. For instance, the net tree can include a plurality of leaves. The computing system can then perform a k-means approximation algorithm on the net tree to partition the plurality of leaves according to respective closest centers into a plurality of partitions. The approximation algorithm is not required to be private. The output of $\mathcal{A}$ gives a partition of the leaves of $\mathcal{T}$ according to which centers they are the closest.

Additionally, the encoded private input data can further include encoded vector summation data. For instance, the encoded vector summation data can be encoded by the generalized bucket summation algorithm (e.g., as described in FIG. 7A). The encoded vector summation data can be decoded to determine a vector summation oracle. For instance, the computing system can determine a decoded vector summation oracle based at least in part on the encoded vector summation data. In some implementations, determining the decoded vector summation oracle is performed at least in part by summing the encoded vector summation data according to $$\Sigma_{i \in [n]} z_i \cdot Z_{v,i}.$$

As one example, an example vector summation decoder is given in Algorithm 8 depicted in FIG. 7B. The vector summation oracle can be used on the plurality of partitions to determine the k centers of the original input data in the original, high-dimensional space. For instance, the computing system can upscale the plurality of partitions to an original higher-dimensionality space based at least in part on the decoded vector summation oracle.

Systems and methods are discussed herein with reference to the local model of differential privacy for the purposes of illustration. Example aspects of the present disclosure can be applied to other suitable differentially private models, such as, for example, the shuffled model. For instance, in some implementations, the differentially private noninteractive communications for which the private data is encoded can be a local model of differential privacy. Additionally and/or alternatively, in some implementations, the differentially private noninteractive communications can be a shuffled model of differential privacy.

Systems and methods according to example aspects of the present disclosure can provide for a number of technical effects and benefits, including improvements to computing technologies. For instance, systems and methods according to example aspects of the present disclosure can provide for constructing, by the computing system, a net tree including potential representatives of the one or more input data points, the potential representatives arranged in a plurality of levels, the net tree including a hierarchical data structure including a plurality of hierarchically organized nodes and a plurality of mappings between the plurality of hierarchically organized nodes. The net tree can, in turn, provide for encoding the one or more input data points for noninteractive differentially private communication. Thus, systems and methods according to example aspects of the present disclosure can provide for and even enable noninteractive differentially private communications with reduced approximation ratios (e.g., closer performance to actual nonprivate algorithms) in turn providing for more accurate conveyance of information while maintaining privacy guarantees.

With reference now to the Figures, example embodiments of the present disclosure will be discussed in further detail.

FIG. 1 depicts a block diagram of an example computing system 100 that performs locally differentially private communications according to example embodiments of the present disclosure. The computing system 100 can include a plurality of source computing devices 102 in communication with a centralized aggregator computing device 104. For instance, the source computing devices 102 can each transmit differentially private communications 106 to the aggregator computing device 104. The aggregator computing device 104 can aggregate the communications 106 and output information about the system 100, such as aggregated private data results. It is desirable to maintain privacy of the source computing devices 102 with regard to the communications 106 and the aggregator computing device 104.

FIGS. 2 through 7B depict mathematically notated algorithms for various operations according to example aspects of the present disclosure. It should be understood that the algorithms described herein are provided for the purposes of illustrating example aspects of the present disclosure, and implementations of those algorithms may include modified and/or additional operations. For instance, data or variables in implementations of those algorithms may be rounded, discretized, privatized, or in other ways manipulated beyond the operations explicitly notated in the algorithms. For instance, the algorithms may be implemented on binary computers, such as the computing device 1000 of FIG. 10.

FIG. 8 depicts a flow chart diagram of an example method to perform encoding private user data for noninteractive differentially private communications according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system (e.g., including one or more computing devices) can obtain private data including one or more input data points. For instance, the computing system can be or can include a source computing device. The source computing device may be a user computing device operated by a user, such as a mobile device, desktop computer, wearable computing device, or any other suitable computing device. The private data (e.g., the one or more input data points) can be user data. As an example, the private data can be or can include vector or other tensor data. For instance, the input data points can be points (e.g., represented by vectors or other tensors) in a d-dimensional space, or having a dimensionality d.

At 804, the computing system can construct a net tree including potential representatives of the one or more input data points. The potential representatives can be arranged in a plurality of levels. For instance, the net tree can be or can include a hierarchical data structure including a plurality of hierarchically organized nodes. The tree may additionally include a plurality of mappings between the plurality of hierarchically organized nodes. The representative can be one of the plurality of hierarchically organized nodes. For instance, the representative of an input data point of the one or more input data points can be a closest potential representative to the input data point. The closest potential representative to the input data point can include a potential representative having a smallest (e.g., Euclidean) distance to the input data point relative to each of the other potential representatives in the net tree.

At 806, the computing system can determine a representative of each of the one or more input data points from potential representatives of the net tree. The representative can be one of the plurality of hierarchically organized nodes. For instance, the representative of an input data point of the one or more input data points can be a closest potential representative to the input data point. The closest potential representative to the input data point can include a potential representative having a smallest (e.g., Euclidean) distance to the input data point relative to each of the other potential representatives in the net tree.

At 808, the computing system can encode the representative of each of the one or more input data points for noninteractive differentially private communication. For instance, the representatives of each input data point can make up a coreset that is representative of the private data. These representatives can be encoded by the source computing system(s) and transmitted to the aggregator computing system, which can then decode the encoded representatives while providing differential privacy guarantees at the source computing devices. An example algorithm for differentially private, noninteractive encoding is given in Algorithm 3 depicted in FIG. 4.

For instance, in some implementations, encoding, by the computing system, the representative of each of the one or more input data points for noninteractive differentially private communication can include encoding, by the computing system, the representative by a generalized bucketized vector summation encoder model. As an example, the generalized bucketized vector summation encoder model can include a mathematical model configured such that $z_i \leftarrow$ $\mathcal{R}_{\mathrm{vec}}(Z_{y_i,i} \cdot x_i)$. Furthermore, one example generalized bucketized vector summation encoder model is given in Algorithm 7 depicted in FIG. 7A. The generalized bucketized vector summation encoder can encode the representatives with an input vector x.

Additionally, in some implementations, encoding, by the computing system, the representative of each of the one or more input data points for noninteractive differentially private communication can include encoding, by the computing system, the representative by a generalized histogram encoder model. As an example, in some implementations, the generalized histogram encoder model can include a mathematical model configured such that:

$$\hat{x}_i \leftarrow Z_{x_i,i} \text{ and } y_i = \begin{cases} \hat{x}_i & \text{with probability } \dfrac{e^{\varepsilon}}{e^{\varepsilon}+1} \\ -\hat{x}_i & \text{with probability } \dfrac{1}{e^{\varepsilon}+1} \end{cases}$$

Furthermore, one example generalized histogram encoder model is given in Algorithm 6 depicted in FIG. 6A.

FIG. 9 depicts a flow chart diagram of an example method to perform decoding private data encoded by a net tree based encoding algorithm according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system including one or more computing devices can obtain encoded private input data. The encoded private input data can be received from one or more (e.g., a plurality of) source computing devices. Additionally and/or alternatively, the computing system can be or can include an aggregator computing device. For instance, the aggregator computing device can aggregate the differentially private encoded input data from a plurality of sources while maintaining privacy of the individual sources. An example algorithm for decoding the private data is given by Algorithm 4 of FIG. 5.

The encoded private input data can include encoded histogram data. For instance, the encoded histogram data can be encoded by the generalized histogram encoder model (e.g., as described in FIG. 6A). At 904, the computing system can determine a decoded frequency oracle based at least in part on the encoded histogram data. In some implementations, determining, by the computing system, the decoded frequency oracle is performed at least in part by summing the encoded histogram data according to $$\frac{e^{\varepsilon}+1}{e^{\varepsilon}-1} \cdot \sum_{i \in [n]} y_i \cdot Z_{v,i}.$$

$\sum_{i \in [n]} y_i \cdot Z_{v,i}$. As one example, an example histogram decoder model that can be used to decode the decoded frequency oracle is given in Algorithm 6 of FIG. 6B. The combination of the generalized histogram encoder model and the decoder model can be an $(O(\sqrt{n \log(|Y|/\beta)}/\varepsilon), \beta)$-accurate $\varepsilon$-DP algorithm for a histogram in the local model. Moreover, it can be made to run in time poly(n, log|Y|).

At 906, the computing system can then construct a net tree based at least in part on the decoded frequency oracle. For instance, the computing system can attempt to recreate the net tree that was constructed for encoding the encoded private input data at the source, based on the decoded frequency oracle. To decode the encoded data, the computing system can first use the encoded histogram to build a frequency oracle, from which the computing system can construct a net tree $\mathcal{T}$ using the algorithms described herein (e.g., Algorithm 1 of FIG. 2).

At 908, the computing system can then run any suitable approximation algorithm $\mathcal{A}$ for k-means on the representative set of the net tree. For instance, the net tree can include a plurality of leaves. The computing system can then perform a k-means approximation algorithm on the net tree to partition the plurality of leaves according to respective closest centers into a plurality of partitions. The approximation algorithm is not required to be private. The output of $\mathcal{A}$ gives a partition of the leaves of $\mathcal{T}$ according to which centers they are the closest.

Additionally, the encoded private input data can further include encoded vector summation data. For instance, the encoded vector summation data can be encoded by the generalized bucket summation algorithm (e.g., as described in FIG. 7A). The encoded vector summation data can be decoded to determine a vector summation oracle. For instance, the computing system can, at 910, determine a decoded vector summation oracle based at least in part on the encoded vector summation data. In some implementations, determining the decoded vector summation oracle is performed at least in part by summing the encoded vector summation data according to $\Sigma_{i\in[n]}\ z_i\cdot Z_{v,i}$. As one example, an example vector summation decoder is given in Algorithm 8 depicted in FIG. 7B. The vector summation oracle can be used on the plurality of partitions to determine the k centers of the original input data in the original, high-dimensional space. For instance, the computing system can, at 912, upscale the plurality of partitions to an original higher-dimensionality space based at least in part on the decoded vector summation oracle.

Figure 10:
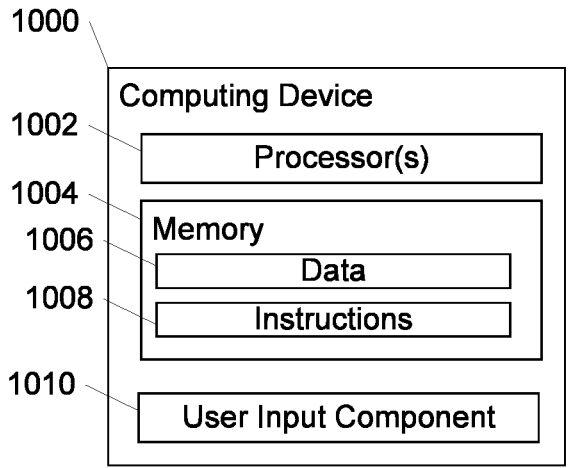
FIG. 10 depicts a block diagram of an example computing device configured to perform any of the operations described herein according to example embodiments of the present disclosure.

FIG. 10 depicts a block diagram of an example computing device 1000 configured to perform any of the operations described herein according to example embodiments of the present disclosure. For instance, the computing device 1000 can be a source computing device (e.g., source computing device 102 of FIG. 1), an aggregator computing device (e.g., aggregator computing device 104 of FIG. 1), and/or any other suitable computing device. In particular, the computing device 1000 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The computing device 1000 includes one or more processors 1002 and a memory 1004. The one or more processors 1002 can be any suitable processing device (e.g., a processor core, a microprocessor, an ASIC, an FPGA, a controller, a microcontroller, etc.) and can be one processor or a plurality of processors that are operatively connected. The memory 1004 can include one or more non-transitory computer-readable storage media, such as RAM, ROM, EEPROM, EPROM, flash memory devices, magnetic disks, etc., and combinations thereof. The memory 1004 can store data 1006 and instructions 1008 which are executed by the processor 1002 to cause the computing device 1000 to perform operations.

The operations can be any suitable operations for implementations of systems and methods according to example aspects of the present disclosure. As one example, the operations can cause the computing device 1000 to perform encoding private user data for noninteractive differentially private communications, such as according to the method 800 of FIG. 8. As another example, the operations can cause the computing device 1000 to perform decoding private data encoded by a net tree based encoding algorithm, such as according to the method 900 of FIG. 9. The operations can additionally and/or alternatively include other operations, such as intermediate operations, data processing operations, or other suitable operations.

The computing device 1000 can also include one or more user input components 1010 that receives user input. For example, the user input component 1010 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for encoding data for communications with improved privacy, the method comprising:

obtaining, by a computing system comprising one or more computing devices, input data comprising one or more input data points;

constructing, by the computing system, a net tree comprising potential representatives of the one or more input data points, the potential representatives arranged in a plurality of levels, the net tree comprising a hierarchical data structure comprising a plurality of hierarchically organized nodes, wherein constructing, by the computing system, the net tree comprising potential representatives of the one or more input data points comprises:

determining, by the computing system, the expansion threshold;

identifying, by the computing system, a number of one or more highest-ranking nodes in the net tree at a first level in the net tree, the number being equal to the expansion threshold; and expanding, by the computing system, the one or more highest-ranking nodes at a second level in the net tree;

wherein the expansion threshold is based at least in part on an optimal transport cost between the one or more input data points and the potential representatives or on a lower bound on a minimum cost between the one or more input data points and the potential representatives;

determining, by the computing system, a representative of each of the one or more input data points from the potential representatives of the net tree, the representative comprising one of the plurality of hierarchically organized nodes; and encoding, by the computing system, the representative of each of the one or more input data points for communication.

2. The computer-implemented method of claim 1, further comprising:

prior to determining a representative of each of the one or more input data points from the potential representatives of the net tree, projecting the one or more input data points to a random subspace; and subsequent to projecting the one or more input data points to the random subspace, scaling the projected input data points to a subspace having reduced dimensionality.

3. The computer-implemented method of claim 1, wherein the communication comprises a local model of differential privacy.

4. The computer-implemented method of claim 1, wherein the communication comprises a shuffled model of differential privacy.

5. The computer-implemented method of claim 1 wherein the net tree comprises a plurality of efficiently decodable nets.

6. The computer-implemented method of claim 1, wherein encoding, by the computing system, the representative of each of the one or more input data points for communication comprises encoding, by the computing system, the representative by a generalized bucketized vector summation encoder model.

7. The computer-implemented method of claim 6, wherein the generalized bucketized vector summation encoder model comprises a vector encoding of a dot product of a shared uniform random component and a potential representative.

8. The computer-implemented method of claim 1, wherein encoding, by the computing system, the representative of each of the one or more input data points for communication comprises encoding, by the computing system, the representative by a generalized histogram encoder model.

9. The computer-implemented method of claim 8, wherein the generalized histogram encoder model produces an output based on a shared uniform random component, wherein the output is positive with probability $e^\varepsilon/(e^\varepsilon+1)$ and negative with probability $1/(e^\varepsilon+1)$, where $\varepsilon$ is a hyperparameter of differential privacy.

10. The computer-implemented method of claim 1, wherein the representative of an input data point of the one or more input data points comprises a closest potential representative to the input data point.

11. The computer-implemented method of claim 10, wherein the closest potential representative to the input data point comprises a potential representative having a smallest Euclidean distance to the input data point relative to each of the other potential representatives in the net tree.

12. A computer-implemented method for clustering input data points with differential privacy guarantees and reduced approximation ratio, the computer-implemented method comprising:

obtaining, by a computing system comprising one or more computing devices, input data comprising one or more input data points;

constructing, by the computing system, a net tree comprising potential representatives of the one or more input data points, the potential representatives arranged in a plurality of levels, the net tree comprising a hierarchical data structure comprising a plurality of hierarchically organized nodes and a plurality of mappings between the plurality of hierarchically organized nodes, wherein constructing, by the computing system, the net tree comprising potential representatives of the one or more input data points comprises:

determining, by the computing system, the expansion threshold;

identifying, by the computing system, a number of one or more highest-ranking nodes in the net tree at a first level in the net tree, the number being equal to the expansion threshold; and expanding, by the computing system, the one or more highest-ranking nodes at a second level in the net tree;

wherein the expansion threshold is based at least in part on an optimal transport cost between the one or more input data points and the potential representatives or on a lower bound on a minimum cost between the one or more input data points and the potential representatives; and determining, by the computing system, a representative of each of the one or more input data points from the potential representatives of the net tree, the representative comprising one of the plurality of hierarchically organized nodes.

13. The computer-implemented method of claim 12, further comprising:

prior to determining a representative of each of the one or more input data points from the potential representatives of the net tree, projecting the one or more input data points to a random subspace; and subsequent to projecting the one or more input data points to the random subspace, scaling the projected input data points to a subspace having reduced dimensionality.

* * * * *